W. J. KNOX.
LOCOMOTIVE THROTTLE VALVE DEVICE.
APPLICATION FILED FEB. 19, 1920.
1,356,925.
Patented Oct. 26, 1920.
3 SHEETS—SHEET 1.
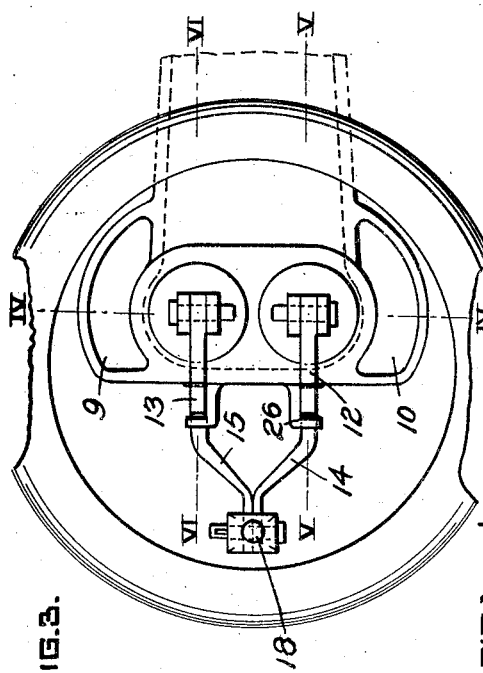
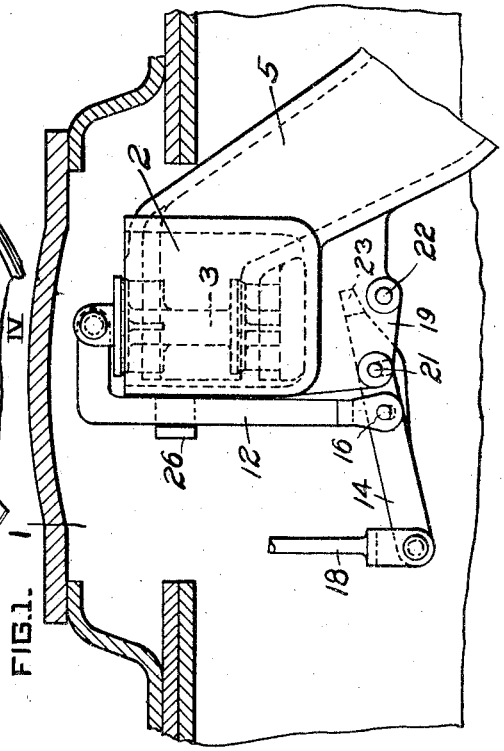
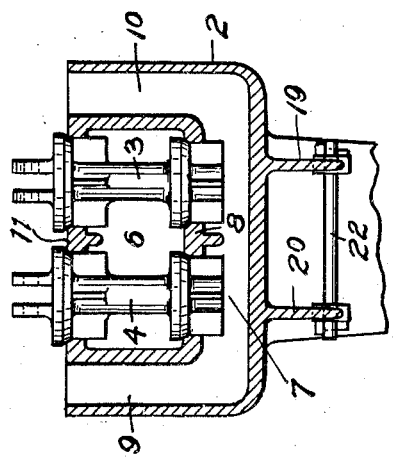
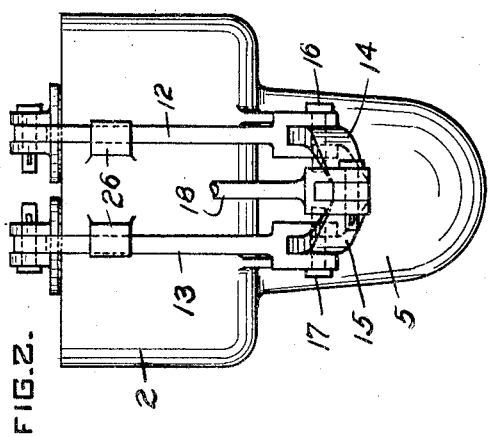
INVENTOR
Wm J Knox
James C. Bradley
ATTORNEYS

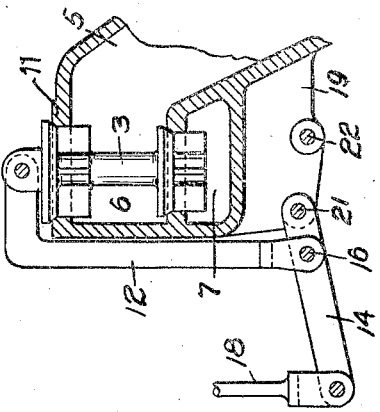
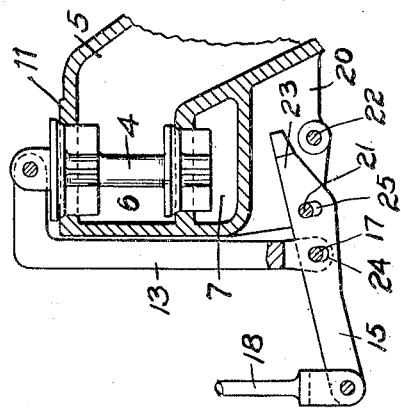
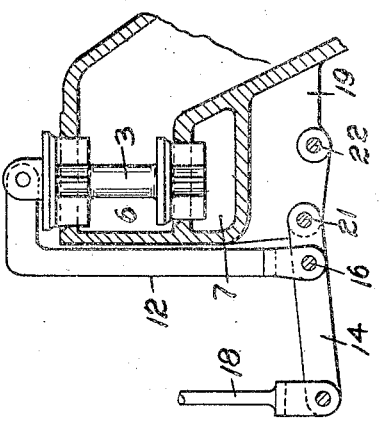
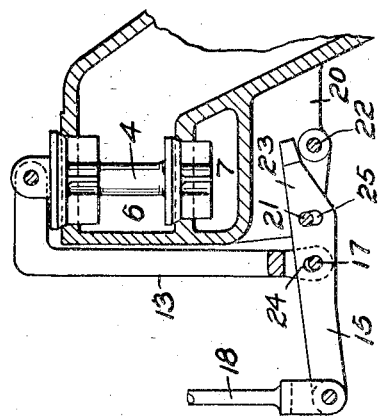
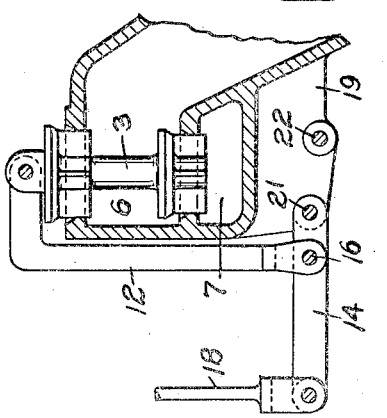
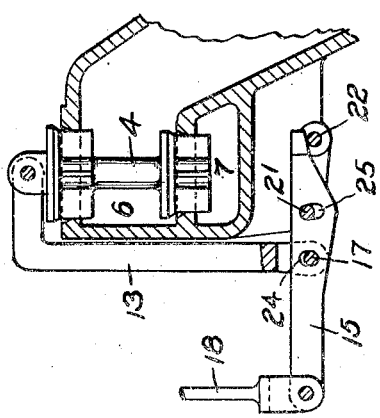

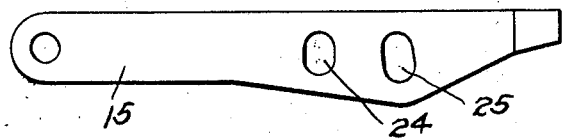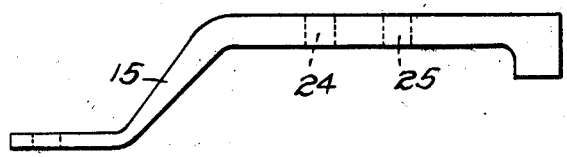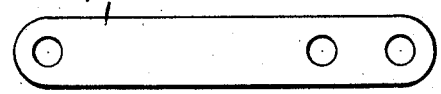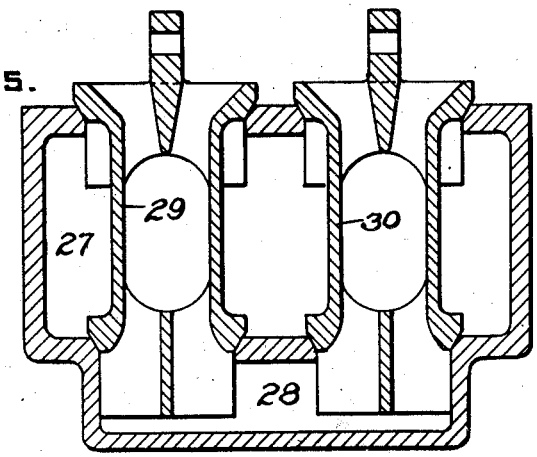

UNITED STATES PATENT OFFICE.

WILLIAM J. KNOX, OF DUBOIS, PENNSYLVANIA.

LOCOMOTIVE-THROTTLE-VALVE DEVICE.

1,356,925.  Specification of Letters Patent.  Patented Oct. 26, 1920.

Application filed February 19, 1920. Serial No. 359,984.

*To all whom it may concern:*

Be it known that I, WILLIAM J. KNOX, a citizen of the United States, and a resident of Dubois, in the county of Clearfield and State of Pennsylvania, have made a new and useful Invention in Locomotive - Throttle-Valve Devices, of which the following is a specification.

The invention relates to locomotive throttle valves. It has for its principal objects; the provision of a double valve construction having an improved system of operating mechanism for securing the successive opening of the valves; the provision of a valve construction of the type specified of compact simple form in which the valves are balanced and the admission is entirely from above so that priming is avoided; and in general the provision of a practical construction, which is more easily operated than the single valve devices now commonly used, which is not subject to the wire drawing action of the ordinary throttle valve, which is positive in operation, and which has a minimum number of parts and is not liable to get out of order or require replacement of parts. Certain embodiments of the invention are illustrated in the accompanying drawings wherein;

Figure 1 is a vertical section through the steam dome of a locomotive showing the throttle valve in side elevation, Fig. 2 is a front view of the valve and operating mechanism. Fig. 3 is a plan view. Fig. 4 is a transverse section on the line IV—IV of Fig. 3. Figs. 5 and 6 are sections respectively on the lines V—V and VI—VI of Fig. 3. Figs. 7 and 8 are sections similar to those of Figs. 5 and 6 but showing the parts in the position occupied after the opening movement is partially under way, with one valve partially open and the other still closed. Figs. 9 and 10 are also sections similar to those of Figs. 5 and 6 but with the operating mechanism and valves in the position occupied after the opening movement of both valves is under way. Figs. 11 and 12 are side elevation and plan views respectively of one of the operating levers. Figs. 13 and 14 are side elevation and plan views respectively of the other operating lever, and Fig. 15 is a transverse section through a modified form of valve construction.

Referring first to the construction as shown in Figs. 1 to 4, 1 is the steam dome of a locomotive in which is mounted the valve casing 2, carrying the valve members 3 and 4 and connected to the pipe 5 leading to the dry pipe proper. The valve casing is divided into an upper chamber 6 and a lower chamber 7, separated by the wall 8, the lower chamber 7 being provided with the upwardly extending inlet passages 9 and 10. The lower wall 8 of the chamber 6 is provided with a pair of valve openings surrounded by suitable seats adapted to be engaged by the lower disks on the valve members 3 and 4, while the upper wall 11 of the chamber 6 is similarly arranged with valve seats upon which are seated the upper disks of the valve members 3 and 4. It will be seen that the valves are in this manner balanced by reason of the steam pressure admitted to the lower chamber 7 and counterbalancing the pressure upon the upper valve disks, and top admission to both valves is secured, thus reducing the danger of priming such as often occurs with low steam domes and the type of valve commonly employed heretofore having an admission to the throttle valve from beneath.

The two valves are operated by the upwardly extending connecting rods 12 and 13 pivotally connected at their upper ends to the lugs on the valve members and at their lower ends to the operating levers 14 and 15, shown in detail in Figs. 11 to 14, by means of the pins 16 and 17. The outer ends of these levers are operated by a common connecting rod 18 which is connected with the throttle lever in the cab by any suitable set of link mechanism which constitutes no part of the present invention. A pair of flanges 19 and 20 are provided extending downwardly from the casing. Upon these are mounted a pair of transverse pivot rods 21 and 22. The levers 14 and 15 are pivoted upon the rod 21, while the rod 22 serves as a stop or fulcrum for the end of the lever 15, for the purpose as hereinafter set forth.

The end of the lever 15 is extended past the rod 21 as indicated at 23 in Fig. 6 and is adapted to engage the rod 22 after the lever has been moved a certain distance from the starting position illustrated in Fig. 6. The lever 15 is also provided with a pair of elongated pivot openings 24 and 25 for securing the lost motion connections whose function is set forth hereinafter and which permit of the partial opening of the valve member 3 before the valve member 4 is given its initial movement.

The operation of the device is as follows. The upward movement of the connecting rod 18 from the position indicated in Figs. 5 and 6 first moves the valve member 3 to the position of Fig. 7 and at the same time moves the lever 15 from the position of Fig. 6 to that of Fig. 8, thus taking up the lost motion in the elongated pivot opening 24 without causing any movement of the valve member 4. The resistance to the opening movement of the valve is thus only one half as great as if both valve members were lifted simultaneously. A further upward movement of the connecting rod 18 brings the parts to the positions indicated in Figs. 9 and 10, the valve member 3 being opened still farther and the opening movement of the valve member 4 started. The lever 15 is now moved so that its end 23 engages the transverse rod 22, such rod constituting the fulcrum for the lever during its further movement. As the connecting rod is moved upward still farther the valve members are opened simultaneously, the opening movement of the member 4 being somewhat more rapid due to the fact that the right hand end of the lever arm 15 is longer than the corresponding end of the lever arm 14. This movement of the lever arm 15 is permitted by reason of the clearance in the elongated pivot opening 25. The connecting rods 12 and 13 are preferably guided by means of the members 26 projecting from the front of the valve casing (Figs. 1 and 3).

It will be seen from the foregoing that the valves are opened successively so that the work of starting the opening movement is reduced, and when the engine is working light and the valve member 3 only is open, such opening is relatively greater than would be the case with a single throttle valve, so that the wire drawing action of the steam between the faces of the valve and seat is reduced and the rapid cutting away of such faces avoided. The valves are balanced by means of the admission of steam to the chamber 7 so that the bottom valve disks are exposed to an upward pressure approximately equal to that on the top disks, and the arrangement is such that all of the admission is from above, thus reducing to a minimum the danger of priming and the troubles incident to the passage of quantities of water into the dry pipe and subsequently to the superheater and cylinders. The construction is compact and simple and can be placed relatively close to the top of the steam dome, still further reducing the danger of the entrance of water into the top of the valve casing which is of particular importance with the extremely large locomotives now employed where the limitations as to clearance restrict the height of the dome. The operating mechanism of the device is also simple and not liable to get out of order and accomplishes the function of providing for the successive and positive opening of the valves with an increased speed of movement of the valve member which is last opened, so that such valve arrives at its full opening at the same time as the other valve. Other advantages incident to the construction will be readily apparent to those skilled in the art.

Still another form of the device involving a changed valve construction is shown in Fig. 15. In this construction the casing is divided into two chambers 27 and 28 and carries the valve members 29 and 30, such valve members being hollow so that they constitute admission passages taking the place of the admission passages 9 and 10 in the first type of construction. It will be noted with this construction as with the first type that the admission all occurs from the top and that the valves are balanced. The operating mechanism employed is preferably the same as shown in the first type of construction.

What I claim is:

1. In combination in a locomotive throttle valve device, a casing having an upper chamber to which the locomotive dry pipe is connected and a lower chamber having ports opening upwardly to the exterior of the casing, a pair of openings provided with valve seats and affording communication from the lower to the upper chamber, a second pair of openings provided with valve seats above the first openings and seats and affording communication from the upper chamber to the exterior of the casing, a pair of valve members each having a pair of disks for engaging the upper and lower seats, and means for operating the valves successively.

2. In combination in a locomotive throttle valve device, a casing having an upper chamber to which the locomotive dry pipe is connected and a lower chamber having ports opening upwardly to the exterior of the casing, a pair of openings provided with valve seats and affording communication from the lower to the upper chamber, a second pair of openings provided with valve seats above the first openings and seats and affording communication from the upper chamber to the exterior of the casing, a pair of parallel valve stems each having a pair of valves for engaging the upper and lower seats, and operating means for the stems whereby the valves on one stem are opened partially before the movement of the other stem is started.

3. In combination in a locomotive throttle valve device, a casing, a chamber therein having connection at one side to the dry pipe and having upper and lower walls each provided with two openings with the openings in the upper wall in alinement with those in the lower wall, an admission passage extending downwardly from the top of the casing and beneath said lower wall, a pair of parallel valve stems each having a pair of valve disks seated in said openings and means for operating the stems successively.

4. In combination in a locomotive throttle valve device, a casing, a chamber therein having connection at one side to the dry pipe and having upper and lower walls each provided with two openings with the openings in the upper wall in alinement with those in the lower wall, an admission passage at each end of the valve casing extending beneath said lower wall, and a pair of parallel valve stems each having a pair of valve disks seated in said openings, and means for operating the stems successively.

5. In combination in a locomotive throttle valve device, a casing, a pair of admission valves in the casing for controlling the flow of steam to the locomotive dry pipe, an operating lever for each valve pivoted below the casing and a connecting rod for each lever mounted for reciprocation on the casing and pivoted at its lower end to its lever and at its upper end to its valve, and a common operating means for the levers, the connection intermediate one valve and its lever having lost motion whereby such valve is permitted to remain closed until the other valve is partially opened.

6. In combination in a locomotive throttle valve device, a casing, a pair of admission valves in the casing for controlling the flow of steam to the locomotive dry pipe, an operating lever for each valve, a common operating means for the levers, a lost motion connection between one valve and its lever, and means whereby the fulcrum of the last mentioned lever is shifted to give a more rapid opening of the valve after the lost motion is taken up.

7. In combination in a locomotive throttle valve device, a casing, a pair of admission valves in the casing for controlling the flow of steam to the locomotive dry pipe, an operating lever for each valve, a common operating means for the levers, a lost motion connection between one valve and its lever, a loose connection between said last lever and its fulcrum, and a second fulcrum for said last lever, which fulcrum is positioned so as to be engaged by the lever after the lost motion between the valve and lever is taken up.

8. In combination in a locomotive throttle valve device, a casing having an upper chamber to which the locomotive dry pipe is connected, and a lower chamber opening upwardly to the exterior of the casing, a pair of openings provided with seats and affording communication from the lower to the upper chamber, a second pair of openings provided with seats above the first openings and seats and affording communication from the upper chamber to the exterior of the casing, a pair of valve members each having a pair of valves engaging the upper and lower seats, and means for operating the valves.

In testimony whereof, I have hereunto subscribed my name this 12th day of February, 1920.

WILLIAM J. KNOX.

Witnesses:
 EDW. A. CAMPNEY,
 JOSEPH M. BISS.